(12) United States Patent
Nothofer et al.

(10) Patent No.: US 7,469,088 B2
(45) Date of Patent: Dec. 23, 2008

(54) STRENGTHENED OPTICAL WAVEGUIDE FIBER CABLE

(75) Inventors: Klaus Nothofer, Erkrath (DE); Peter Lausch, Krefeld (DE)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/848,740

(22) Filed: Aug. 31, 2007

(65) Prior Publication Data
US 2008/0056652 A1 Mar. 6, 2008

(30) Foreign Application Priority Data
Aug. 31, 2006 (WO) ............... PCT/NL2006/000439

(51) Int. Cl.
*G02B 6/44* (2006.01)
(52) U.S. Cl. ...................... 385/113; 385/110
(58) Field of Classification Search .......... 385/100–113
See application file for complete search history.

(56) References Cited

U.S. PATENT DOCUMENTS

| | | | |
|---|---|---|---|
| 5,267,932 A | 12/1993 | Grant | |
| 6,091,871 A | 7/2000 | Elisson et al. | |
| 6,167,178 A | 12/2000 | Nave | |
| 6,215,931 B1 * | 4/2001 | Risch et al. ................ | 385/109 |
| 7,035,511 B1 | 4/2006 | Rhoney et al. | |
| 2004/0151906 A1 | 8/2004 | Pinto | |
| 2008/0056652 A1 | 3/2008 | Nothofer et al. | |

FOREIGN PATENT DOCUMENTS

| | | | |
|---|---|---|---|
| EP | 0005029 A | 10/1979 | |
| EP | 1895340 A1 | 3/2008 | |
| FR | 2497964 A1 | 7/1982 | |
| GB | 1529001 A | 10/1978 | |
| WO | 01/51554 A1 | 7/2001 | |
| WO | 2008026911 A1 | 3/2008 | |

OTHER PUBLICATIONS

Corning Cable Systems: "FREEDM LST Gel-Free Cables" [Online] Oct. 2005, pp. 1-4, USA, Retrieved from the Internet: URL:http://www.corningcablesystems.com/web/library/litindex.nsf/$all/LAN-87-EN/$file/LAN-87-EN.pdf>.
International Search Report and Written Opinion for Corresponding International Application PCT/NL2006/000439, mailed on Mar. 9, 2007.
Extended European Search Report in corresponding European Application Serial No. 07016906, dated Nov. 26, 2007.

* cited by examiner

*Primary Examiner*—Kevin S Wood
(74) *Attorney, Agent, or Firm*—Summa, Addition & Ashe, P.A.

(57) ABSTRACT

The present invention relates to a loose tube optical waveguide fiber cable that is suitable for riser or plenum applications. The cable includes a protective tube that loosely surrounds two or more optical waveguides inside the hollow cavity defined by the tube. The protective tube has an inner surface and an outer surface and is a dry structure. Accordingly, the protective tube does not contain any gel-like compounds or other materials around the optical fibers positioned inside the protective tube. Strengthening members are disposed between the inner surface of the protective tube and the outer surface of the protective tube. The strengthening members are configured as embedded or layered strengthening elements and are disposed longitudinally along the length of the cable.

13 Claims, 1 Drawing Sheet

STRENGTHENED OPTICAL WAVEGUIDE FIBER CABLE

CROSS-REFERENCE TO PRIORITY APPLICATION

This application claims the benefit of pending International Application No. PCT/NL2006/000439 (filed Aug. 31, 2006, under the Patent Cooperation Treaty at the Dutch Patent Office), via 35 U.S.C. §365(a). International Application No. PCT/NL2006/000439 is hereby incorporated by reference in its entirety.

FIELD OF THE INVENTION

The present invention relates to loose tube optical waveguide fiber cables suitable for riser or plenum applications.

BACKGROUND OF THE INVENTION

Optical waveguide fibers are normally provided with a plastic protective coating applied by the fiber manufacturer directly over the cladding to protect the fiber.

In tight buffered cables, a protective tube is applied by the cable manufacturer directly to the outer surface of the fiber coating so that the fiber and the tube are in contact substantially along their lengths. In loose tube or composite buffer constructions, the coated optical fiber is separated from the protective tube.

U.S. Pat. No. 5,627,932 relates to a single optical waveguide fiber having an outer coating, a layer of loose tensile fibers surrounding the optical waveguide fiber outer coating, and a tubular jacket of plastic material surrounding the layer of loose tensile fibers. The cable contains no gel-like compounds. The layer of loose tensile strength fibers, such as Kevlar aramid fibers, is twisted around the buffered optical fibers, and an outer jacket of plastic material is extruded around the layer of said strength fibers.

U.S. Pat. No. 7,035,511 relates to a protective casing for an optical waveguide fiber including an outer tubing, an inner tubing with a passageway therethrough, and a layer of strength members. The outer tubing is preferably PVC, and the materials for the inner tubing can include suitable grades of polyetherimide, polyetheretherketone, or fluoroplastic THV. The layer of strength members is positioned between the outer tubing and the inner tubing for carrying any applied tensile load, and these strength members are aramid fibers or fiberglass fibers that allow flexibility while providing the necessary tensile strength. The layer of strengthening members includes a plurality of strands of aramid yarn that are wrapped about the outer surface of the inner tubing during manufacture. The protective casing is thus made of three separate materials (i.e., the polyetherimide inner tubing, the aramid strength fibers, and the PVC outer tubing).

U.S. Pat. No. 6,091,871 relates to a reinforced optical fiber cable comprising a protective tube for protecting optical fibers, a reinforcing layer and reinforcing rods around the protective tube, together with an outer sheath. To protect the optical fibers against penetration of moisture, the inside space holding the optical fibers contains a filler material. The cable of the '871 patent further includes strengthening rods embedded in the sheath positioned parallel to the cable axis and a reinforcing layer that is between the protective tube and the outer sheath. The reinforcing layer may include wires or elements having high traction strength, i.e., fibers made of aramid, glass, or fiber reinforced plastic (FRP) material, which are wound helically around the tubular structure.

European Patent Application No. 0 005 029 relates to an optical fiber unit consisting of a tubular sheath surrounding optical fibers. The sheath is reinforced by two steel wires, which are embedded in the tube wall, diametrically opposite to one another, and which extend continuously along the whole length of the sheath. The sheath is made of polyethylene.

U.S. Pat. No. 5,627,932 relates to a tight buffered optical fiber cable containing optical fiber surrounded by a coating applied directly over the optical fiber. A layer of loose tensile strength members is applied over the buffered optical fiber, and an outer polymer tubular jacket is extruded over the aforementioned layer, wherein the outer jacket is formed of PVC material.

One disadvantage of the optical fiber cables according to the prior art is that the tight buffered fibers and the central filled loose tubes are expensive. Moreover, accessing the fibers is a time consuming process, and especially when a gel-filled, central loose tube is used, fiber cleaning is necessary.

SUMMARY OF THE INVENTION

In view of the foregoing state of the art, it is therefore an object of the present invention to provide a loose tube optical waveguide fiber cable that is suitable for fixed in-house cabling and is cost-effective for large-scale installation of fiber-to-the-home (FTTH).

Another object of the present invention is to provide a loose tube optical waveguide fiber cable wherein the fiber access time is reduced substantially compared to the standard cable elements.

These and other objects are achieved, according to the present invention, by providing a loose tube optical waveguide fiber cable comprising: (i) two or more optical waveguides; (ii) a protective tube loosely surrounding the two or more optical waveguides, wherein the tube has an inner surface and an outer surface, with no gel-like compounds therein; and (iii) one or more strengthening members disposed between the inner surface of the protective tube and the outer surface of the protective tube, wherein the strengthening members include either one or more longitudinally embedded strengthening elements or a longitudinal layer of material that serves as a strengthening element, and wherein the one or more strengthening members extend continuously along the length of the protective tube.

The foregoing, as well as other objectives and advantages of the invention, and the manner in which the same are accomplished, are further specified within the following detailed description and its accompanying drawing.

DETAILED DESCRIPTION

Figure 1:
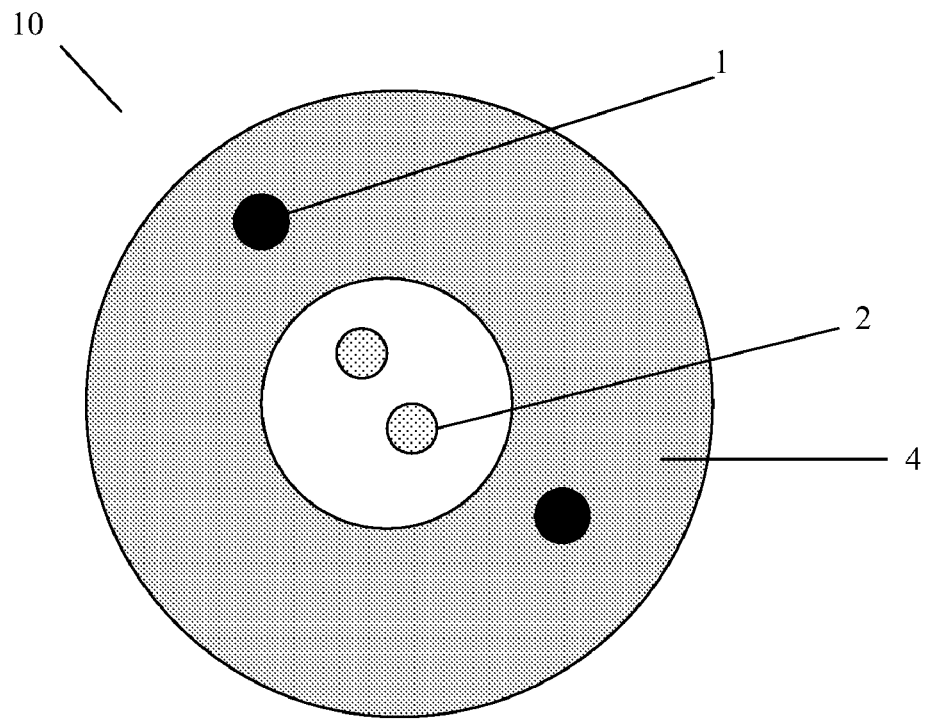
FIG. 1 schematically depicts a cross-sectional view of a loose tube cable having an embedded strengthening element.
Figure 2:
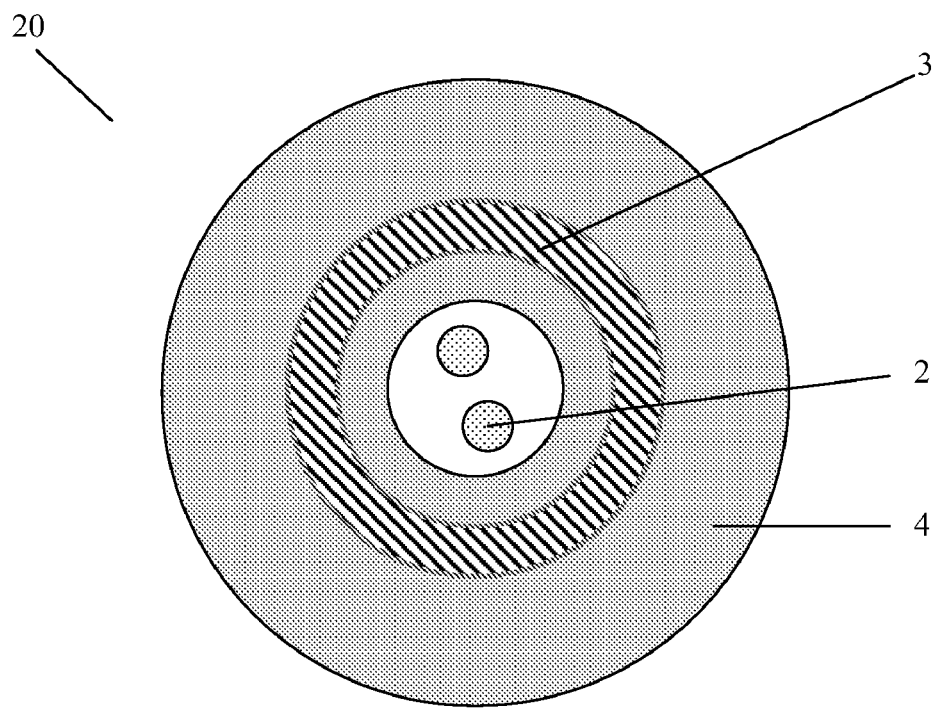
FIG. 2 schematically depicts a cross-sectional view of a loose tube cable having a layered strengthening element wound within an inner region of the protective tube.

A loose tube optical waveguide fiber cable 10 may be constructed as shown in FIGS. 1 and 2. Cable 10 contains two optical fibers 2 surrounded by a coating (not shown) applied directly over the optical fiber 2. The number of optical fibers 2 is not restricted to two (i.e., more than two may be used). There are no filling gels, swellable materials, or the like present in the space between the optical fibers 2 and the inner surface of the protective tube 4. The optical fiber 2 may be composed of a core and a cladding surrounding the core, with one or more polymer coatings applied over the cladding. A protective tube 4 loosely surrounds the optical fibers 2.

The cable 10 has strengthening elements 1 that are relatively flexible and that have high traction strength. The strengthening elements 1 are embedded in the sheath 4 parallel to the axis of the cable 10 (i.e., between the inner surface of the protective tube 4 and the outer surface of protective tube 4). These strengthening elements 1 may be made of reinforced plastics material, glass or aramid yarns, or steel.

FIG. 1 schematically depicts two such elements 1 opposite each other. In another embodiment (not shown) there could be four strengthening elements 1, in which case the strengthening elements 1 would be symmetrical in pairs about a diametral plane of the cable and positioned at a small distance from that plane.

FIG. 2 schematically depicts another embodiment of the cable 20 according to the present invention. As shown in FIG. 2, a layer of material serving as a strengthening element 3 ("the layered strengthening element") is wound within the protective tube 4 (or sheath) during the sheath manufacturing process such that the layered strengthening element 3 is located outside the hollow cavity housing the optical fibers 2. In the embodiment of FIG. 2, the layered strengthening element 3 substantially wraps the entire length of cable 20, parallel to the cable axis, and forms a uniform, substantially concentric (i.e., ringed) strengthening layer within the protective tube 4. Although FIG. 2 schematically depicts one layered strengthening element 3, it is within the scope of the invention to include a plurality of layered strengthening elements 3 within the cable 20.

It is further within the scope of the invention for the layered strengthening element 3 to be helically positioned within the protective tube 4. In such embodiments, the layered strengthening element 3 surrounds an inner portion of the protective tube 4. The layered strengthening element 3 is positioned along the length of the protective tube 4 but does not completely cover an inner region the tube 4.

Stated otherwise and by way of illustration, a helical positioning of the layered strengthening element 3 achieves a candy-cane effect around an inner portion of the protective tube 4. In this regard, the strengthening layer covers the sheath material only intermittently.

In other words, the layered strengthening element 3 at least partially surrounds the hollow cavity defined by the protective tube 4 housing only the optical fibers 2. In this cavity there are no filling gels, swellable materials, or other strengthening members present. The cavity is of a "dry" structure.

The layered strengthening element 3 is embedded in the sheath 4, and the sheath 4 is made of a uniform material (i.e., the inner surface of the layered strengthening element 3 is in contact with the same sheath material as is the outer surface of layered strengthening element 3). This construction is different than the protective casing disclosed in U.S. Pat. No. 7,035,511, in which a layer of strengthening member material is positioned between an inner tubing and an outer tubing formed of different materials.

In order to maintain sufficient crush, impact, and cut-through resistance, it is preferred that the inner diameter of the protective tube 4 is about one millimeter, and the outer diameter is about four millimeters. The optical waveguide fibers 2 have a typical diameter of about 0.250 millimeter.

To ensure easy installation in difficult environments, the loose tube optical waveguide fiber cables 10, 20 according to the present invention include strengthening yarns 1, 3 that are embedded in the protective tube 4. This means that there are no other materials or elements present in the space between the optical waveguide fibers 2 and the inner surface of the protective tube 4. The present cable 10, 20 is totally dry (gel-free) and has a minimum static bend radius of 25 mm with standard single mode fibers, and a minimum static bend radius of 10 mm with low bend loss fibers.

The wall thickness of the protective tube 4 is typically in a range of 0.3-0.45 times (e.g., 0.35-0.45 times) the outer diameter of the protective tube 4. The protective tube 4 is formed of a flame-retardant material. The protective tube 4 is made of a uniform material (i.e., its composition throughout the wall thickness is the same). The protective tube 4 is a single layer tube. Such a cable may be installed in a plenum or riser application.

As used herein, the term "loose" should be understood to mean that the optical fibers 2 have a freedom of movement within the cavity in both radial and axial directions. Such a freedom of movement of optical fiber waveguides 2 within the protective tube 4 is advantageous in that it reduces optical losses in the waveguides in operation.

Fiber access is easy due to the use of halogen-free, fire-retardant sheathing material made of thermoplastics with a high fraction of inorganic fillers. This kind of material breaks easily when an initial cut is made.

In one embodiment of the present invention, the material of the protective tube 4 is a flame-retardant material with a high fraction of inorganic fillers. The flame-retardant material typically has a density of greater than 1.35 g/cm$^3$. In addition, the inner diameter of the protective tube 4 is at least 0.5 mm greater than the diameter of the closest theoretical circle that could be formed around the two or more optical waveguide fibers.

For the cable 10 with strength yarns embedded in the sheath, a simple way to access the optical fibers is to cut a short piece (e.g., about 10 centimeters) of the sheath 4 by circular cut with a conventional cable knife, then break the sheath 4 by repeated bending and pull away the sheath 4 over the optical fibers 2 and strength yarns 1. At this point, one can use the longitudinal strength elements 1 as ripcord(s) to expose the desired cable length.

For the cable 20 with layered strength elements 3 between the inner and outer part of the sheath 4, one may cut a short piece (about 10 cm) of the sheath 4 in a circular fashion with a conventional cable knife down to the strength elements 3 and pull away the sheath 4. Next, the strength yarns may be gripped and used as ripcords to open the desired length of the outer sheath portion.

In another embodiment of the cable 20, especially when a large number of strength elements 3 are used, one of the strength elements 3 may be designated as the ripcord (e.g., indicating via different color or using a different material). Depending on the wall thickness, the inner part of the sheath 4 can be removed either by hand or with a conventional cable or fiber stripper. Because of the absence of any filling compound within the tube 4, this can be accomplished in one operation over the desired length.

The method of manufacturing the loose tube optical waveguide fiber cable 10, 20 is similar to buffer tube extrusion at standard secondary coating lines. To maintain certain values of excess fiber length, the fiber payoff is equipped with a tension control device. Typical values are around 0.5 to 2 N. The fiber passes the extruder crosshead. The extruder is typically equipped with a specially designed screw, a breaker, a crosshead, and tooling for accommodating the flame retardant material.

The strength-members 1, 3 could be applied either by guiding tubes, which guide the yarns directly into the flow channel of the crosshead such that the plastic material encapsulates the strength members 1, 3 before leaving the crosshead. Another way is to use two extruders so that the strength yarns 1, 3 will be applied onto the tube leaving the first extruder before entering the second one. Adjacent to the first cooling section is a pull-off capstan or similar device. The cable is turned at least with one turn—typically two to four turns—around the capstan.

The capstan is necessary because the lack of filling compound requires the capstan to couple the optical fibers 2 to the protective tube 4. Also, the distance between the crosshead and the capstan affects the excess fiber length. Cooling conditions, the tension controlled between the capstan and the downstream pulling device, and the tension between the pulling device and the take-up device further affect the excess fiber length.

Examples of the materials that can be used for the protective tube 4 are DRAKA DHF9822, DRAKA DHF9761 and Scapa MELGOLON S 550. These materials are generally composed of polymers or copolymers of polyolefins. Other plastic materials such as EVA, polyamides or polyphenyleneester ester might also be suitable. Mineral fillers in the tubing material (e.g., aluminium hydroxide or magnesium hydroxide) give the desired level of flame retardance. Typically, cables 10, 20 according to the present invention contain additional components such as UV stabilizers, antioxidants, color pigments, and processing additives. As noted, the protective tube 4 according to the present invention is a single-layer protective tube.

The accompanying drawings, which are incorporated and constitute part of the specification, illustrate two embodiments of the invention, and together with the description, serve to explain the principles of the invention. It is to be understood, of course, that both drawings and the descriptions are explanatory only and do not limit the invention. Like numbers refer to the like elements throughout. The drawings are not necessarily drawn to scale but are configured to clearly illustrate the invention. The scope of the invention is set forth in the following claims.

The invention claimed is:

1. A loose tube optical waveguide fiber cable that is suitable for fixed in-house cabling for large-scale installation of fiber-to-the-home (FTTH), said cable comprising:
   (a) two or more optical waveguides;
   (b) a protective tube loosely surrounding said two or more optical waveguides, said protective tube comprising an inner surface and an outer surface, wherein the wall thickness of the protective tube is in a range of 0.3 to 0.45 times the outer diameter of the protective tube, and wherein said cable contains no gel-like compounds; and
   (c) one or more strengthening members being disposed between the inner surface of the protective tube and the outer surface of the protective tube as one or more longitudinal strengthening elements or as a layered strengthening element, wherein said one or more strengthening members extend continuously along the length of the protective tube.

2. A loose tube optical waveguide fiber cable according to claim 1, wherein the material of the protective tube is a halogen-free, flame-retardant polymer.

3. A loose tube optical waveguide fiber cable according to claim 2, wherein the density of the material of the protective tube is a least 1.35 g/cm$^3$.

4. A loose tube optical waveguide fiber cable according to claim 1, wherein the inner diameter of said protective tube is at least 0.5 mm greater than the diameter of the closest circle around the two or more optical waveguide fibers.

5. A loose tube optical waveguide fiber cable according to claim 1, wherein the wall thickness of the protective tube is in the range of 0.35 to 0.45 times the outer diameter of the protective tube.

6. A loose tube optical waveguide fiber cable according to claim 1, wherein the protective tube consists of a single-layer protective tube loosely surrounding said two or more optical waveguides.

7. A loose tube optical waveguide fiber cable according to claim 1, wherein said one or more strengthening members consist of two longitudinal strengthening elements extending continuously along the length of the protective tube.

8. A loose tube optical waveguide fiber cable according to claim 1, wherein said one or more strengthening members comprise a layered strengthening element.

9. An optical fiber cable installation, comprising:
   a plenum or riser; and
   a loose tube optical waveguide fiber cable positioned directly within said plenum or said riser, said cable comprising (i) a plurality of optical waveguides, (ii) a protective tube loosely surrounding said plurality of optical waveguides, said protective tube comprising an inner surface and an outer surface, wherein the wall thickness of said protective tube is between about 0.3 to 0.45 times the outer diameter of the protective tube, (iii) one or more strengthening members being disposed between the inner surface of said protective tube and the outer surface of said protective tube, wherein said one or more strengthening members extend continuously along the length of said protective tube, and (iv) wherein said cable contains no gel-like compounds.

10. An optical fiber cable installation according to claim 9, wherein the cable installation is a fiber-to-the-home (FTTH) installation.

11. An optical fiber cable installation according to claim 9, wherein said cable's protective tube consists of a single-layer protective tube loosely surrounding said plurality of optical waveguides.

12. An optical fiber cable installation according to claim 9, wherein said cable's one or more strengthening members comprise one or more longitudinal strengthening elements extending continuously along the length of said protective tube.

13. An optical fiber cable installation according to claim 9, wherein said cable's one or more strengthening members comprise a layered strengthening element extending continuously along the length of said protective tube.

* * * * *